United States Patent [19]

Braun et al.

[11] 4,187,147
[45] Feb. 5, 1980

[54] RECIRCULATION SYSTEM FOR NUCLEAR REACTORS

[75] Inventors: Howard E. Braun, Pittsburgh; Walter J. Dollard, Churchill; Stephen N. Tower, Franklin Township, Westmoreland County, all of Pa.

[73] Assignee: Westinghouse Electric Corp., Pittsburgh, Pa.

[21] Appl. No.: 659,867

[22] Filed: Feb. 20, 1976

[51] Int. Cl.$^2$ ............................................. G21C 9/00
[52] U.S. Cl. ..................................... 176/38; 176/61; 176/65
[58] Field of Search ...................... 176/37, 38, 40, 60, 176/65, 61

[56] References Cited

U.S. PATENT DOCUMENTS

| | | | |
|---|---|---|---|
| 3,823,066 | 7/1974 | Thome | 176/50 |
| 3,966,548 | 6/1976 | Müller et al. | 176/37 |
| 3,976,834 | 8/1976 | Bevilacqua | 176/38 |

FOREIGN PATENT DOCUMENTS 2446090 4/1976 Fed. Rep. of Germany ............. 176/38

Primary Examiner—Samuel W. Engle
Assistant Examiner—Ralph Palo
Attorney, Agent, or Firm—M. S. Yatsko

[57] ABSTRACT

A recirculation system for use in pressurized water nuclear reactors to increase the output temperature of the reactor coolant, thereby achieving a significant improvement in plant efficiency without exceeding current core design limits. A portion of the hot outlet coolant is recirculated to the inlets of the peripheral fuel assemblies which operate at relatively low power levels. The outlet temperature from these peripheral fuel assemblies is increased to a temperature above that of the average core outlet. The recirculation system uses external pumps and introduces the hot recirculation coolant to the free space between the core barrel and the core baffle, where it flows downward and inward to the inlets of the peripheral fuel assemblies. In the unlikely event of a loss of coolant accident, the recirculation system flow path through the free space and to the inlets of the fuel assemblies is utilized for the injection of emergency coolant to the lower vessel and core. During emergency coolant injection, the emergency coolant is prevented from bypassing the core through the recirculation system by check valves inserted into the recirculation system piping.

17 Claims, 13 Drawing Figures

| 0.96 | 1.12 | 1.02 | 1.16 | 1.11 | .90 | .89 | .87 |
|------|------|------|------|------|-----|-----|-----|
| 1.12 | 1.15 | 1.17 | 1.01 | 1.17 | .95 | 1.18 | .86 |
| 1.02 | 1.17 | 1.11 | 1.01 | 1.14 | .96 | .89 | .82 |
| 1.16 | 1.01 | 1.01 | 0.97 | 1.19 | 1.12 | 1.11 | .65 |
| 1.11 | 1.17 | 1.14 | 1.19 | 1.10 | .97 | .91 | |
| 0.90 | 0.95 | 0.96 | 1.12 | 0.97 | 1.06 | .64 | |
| 0.89 | 1.18 | 0.89 | 1.11 | 0.81 | 0.64 | | |
| 0.87 | 0.88 | 0.82 | 0.65 | | | | |

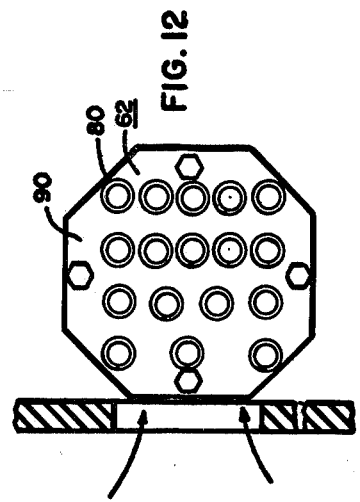
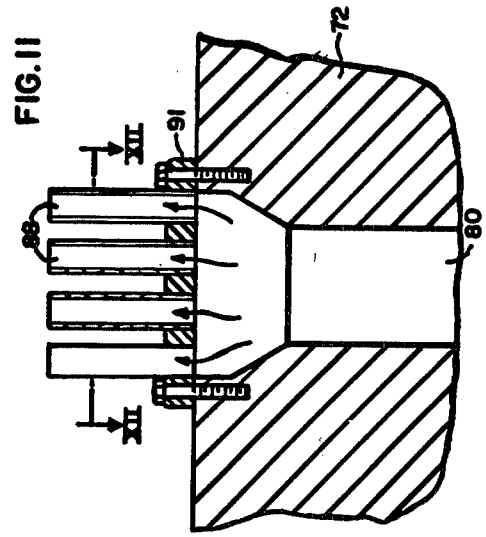
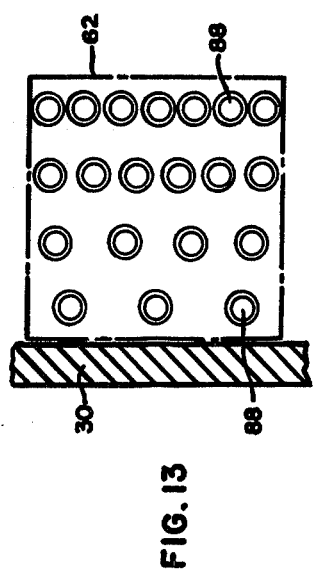
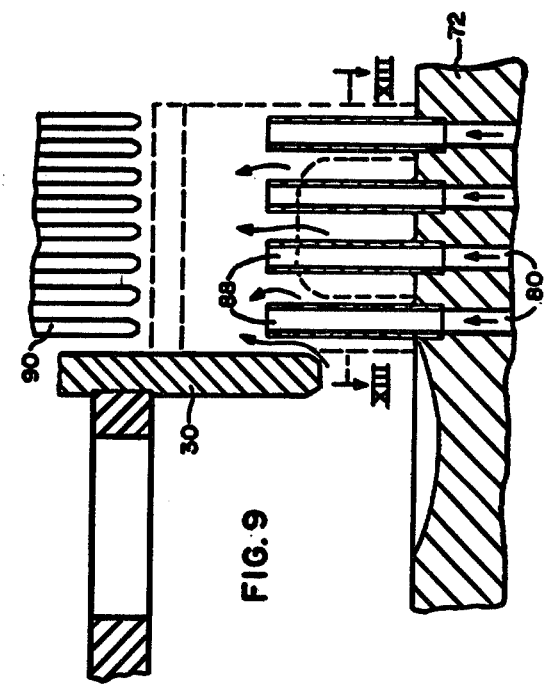

RECIRCULATION SYSTEM FOR NUCLEAR REACTORS

BACKGROUND OF THE INVENTION

This invention relates generally to nuclear reactors and more particularly to a recirculation system for use in pressurized water nuclear reactors to increase the outlet temperature of the reactor coolant.

The peripheral fuel assemblies of an open-lattice nuclear core characteristically operate at power levels significantly below that of the core average. The reactor coolant exiting from these peripheral fuel assemblies is at a temperature considerably below that of the rest of the core, and results in a degradation of the average coolant outlet temperature. For economic and environmental reasons, it is desirable to have the outlet temperature of the reactor coolant be as high as possible for a given size of reactor. For example, for each five degree fahrenheit increase in coolant outlet temperature for a 3800 megawatt thermal plant, the electrical output of the plant will increase by 6000 to 7000 kilowatts. This increase, in turn, reduces the size of reactor required, increases thermal efficiency, and reduces the amount of rejected thermal energy, with corresponding decreases in cost and environmental impacts.

Various methods have been utilized for attempting to increase the outlet temperature from the peripheral fuel assemblies, but none has proven entirely effective. Regional orificing, either at the inlet or the outlet, fails to provide the desired increase in temperature, because of the large amount of cross-flow of reactor coolant in an open-lattice core. Flow simulations have determined that the effect of the cross-flow in open-lattice cores results in a uniform reactor coolant flow less than halfway up the fuel assemblies.

Distributive orificing, wherein physical separation devices, such as orifice plates or support grids, are inserted at several locations along the peripheral fuel assemblies to provide a less-favorable flow path, are generally disfavored. Because the fuel assemblies in the center of the core burn up at a rate greater than those of the periphery, a common practice in the nuclear reactor field has been to shuffle the fuel assemblies; that is, to prolong the life of a given nuclear core, during the life of the core, the peripheral fuel assemblies are inserted near the center of the core, and the fuel assemblies which were located at the center of the core are removed from the reactor. Because of the additional distribution devices inserted into a fuel assembly for distributive orificing, the fuel assemblies are not similar, heat transport capability is reduced, and shuffling cannot occur. Thus, the increase of economy realized by the higher plant efficiency is lost by the inability to shuffle the fuel assemblies.

Changing the hydraulic diameter of the outer assemblies, or placing the peripheral fuel assemblies in a "can" to provide a closed flow channel, have the same drawbacks in that shuffling of the various fuel assemblies is prohibited.

Another important consideration in the design of nuclear reactors is safety. The nuclear reactors must be designed such that in the event of an accident, however unlikely it may be, the public is not thereby injured. One of the most serious accidents hypothesized is a double-ended pipe rupture, wherein one of the main coolant pipes breaks, resulting in a loss of coolant flow to the core and leading to a core meltdown. Prior practice in the field has been to store a large quantity of coolant for use in emergencies, and connect this stored coolant to the main coolant inlets of the reactor pressure vessel. Then, in the unlikely event of a pipe rupture, the stored coolant was pumped at high pressure to the main coolant inlet, where it flowed down to the bottom of the pressure vessel. Two problems are associated with this solution.

In this type of accident, the coolant already in the nuclear reactor pressure vessel heats, changing to steam, and this steam gathers in the downcomer annulus between the core barrel and the pressure vessel where the emergency coolant is attempting to flow. This steam seriously impedes a flow of the emergency coolant, thereby causing the emergency injection to lose much of its effectiveness.

The other problem is that, if the pipe rupture accident occurs in one of the coolant inlet pipes, the emergency coolant which is being pumped to that inlet nozzle will, instead of entering the pressure vessel to flood the nuclear core, flow through the pipe and out through the rupture.

SUMMARY OF THE INVENTION

The aforementioned problems of the prior art are eliminated by this invention by utilizing the hot reactor coolant to increase the exiting temperature of the reactor coolant from the peripheral fuel assemblies. A portion of the reactor coolant flowing through the outlet means of the pressure vessel is extracted, flows through recirculation system piping, through an inlet into the pressure vessel, and to the free space between the core baffle and the core barrel. From this free space, it flows through openings in the core baffle to the area beneath the peripheral fuel assemblies, where it is mixed with the cold reactor coolant, and distributed to the outer fuel assemblies. The emergency coolant system is connected to this recirculation system inlet, and in the unlikely event of a loss of coolant accident, the emergency coolant is pumped through this nozzle and through the recirculation flow path to the bottom of this core. During operation of the emergency coolant system, check valves or other means prevent the emergency coolant from flowing through the recirculation system to bypass the core.

BRIEF DESCRIPTION OF THE DRAWINGS

Reference is now made to the description of the preferred embodiment, taken in connection with the accompanying drawings, in which:

FIG. 9 is a modification of the view shown in FIG. 7;

FIG. 11 is a modification of the view shown in FIG. 7;

FIG. 12 is a plan view taken along the line XII—XII of FIG. 11; and

FIG. 13 is a plan view taken along the line XIII—XIII of FIG. 9.

DESCRIPTION OF THE PREFERRED EMBODIMENT

Figure 1:
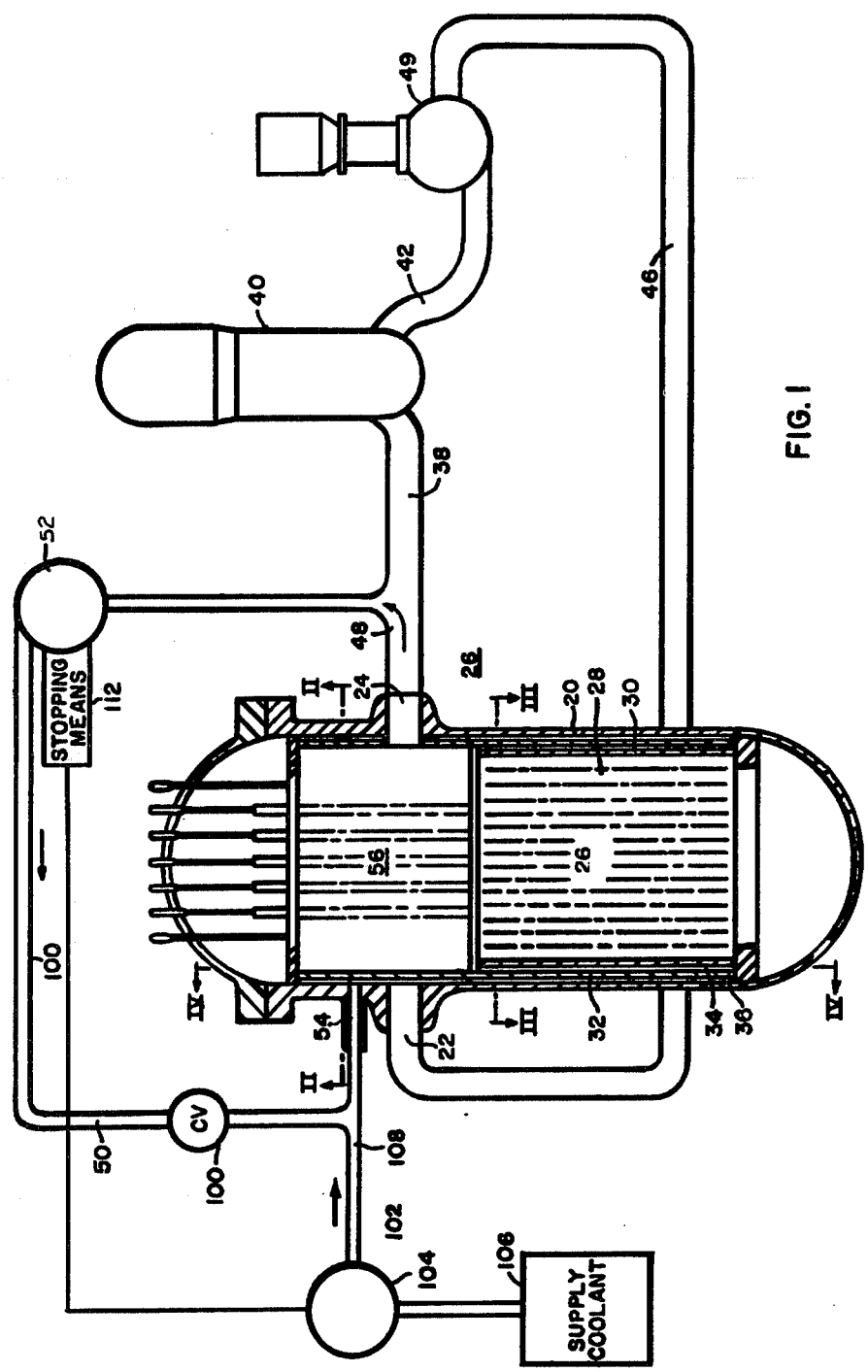
FIG. 1 is a schematic illustration of a nuclear reactor system utilizing this invention.

Throughout the description which follows, like reference characters indicate like elements of the various figures of the drawings.

A pressurized water nuclear reactor system utilizing the principles of this invention is schematically illustrated in FIG. 1. A cylindrical nuclear reactor pressure vessel 20 has coolant flow inlet means 22 and coolant flow outlet means 24 formed integral with and through its cylindrical walls. The pressure vessel 20 houses a nuclear core 26, comprised of a plurality of fuel assemblies 28. Adjacent to the core 26 is a core baffle 30. Surrounding the core baffle 30 is a cylindrical core barrel 32. Between the core baffle 30 and the core barrel 32 is an inner space 34. The core barrel 32 is attached to the inner walls of the pressure vessel 20, and an annular outer space 36 is formed therebetween.

The reactor coolant, which in a pressurized water nuclear reactor is water, exits through the pressure vessel outlet means 24, and flows through interconnecting piping 38 to a heat exchanger 40. In the heat exchanger 40, the hot reactor coolant transfers its heat to a fluid of another system (not shown), then exits into additional interconnecting piping 42. The reactor coolant is then pumped by the main pump 44, through interconnecting piping 46, and into the pressure vessel coolant inlet means 22.

A portion of the hot reactor coolant exiting through the outlet means 24 of the pressure vessel 20 is extracted from the outlet means 24 by the recirculation coolant extraction means 48. The extracted reactor coolant flows through a section of recirculation piping 50 to the recirculation pump 52, where the portion of coolant extracted is pumped through additional recirculation piping 50 to a recirculation system inlet 54 into the pressure vessel 20. The recirculation piping 50 and the recirculation pump 52 together comprise means 100 for supplying the portion of reactor coolant extracted from the vessel outlet means 24 to the recirculation system inlet 54.

Figures 2, 10:
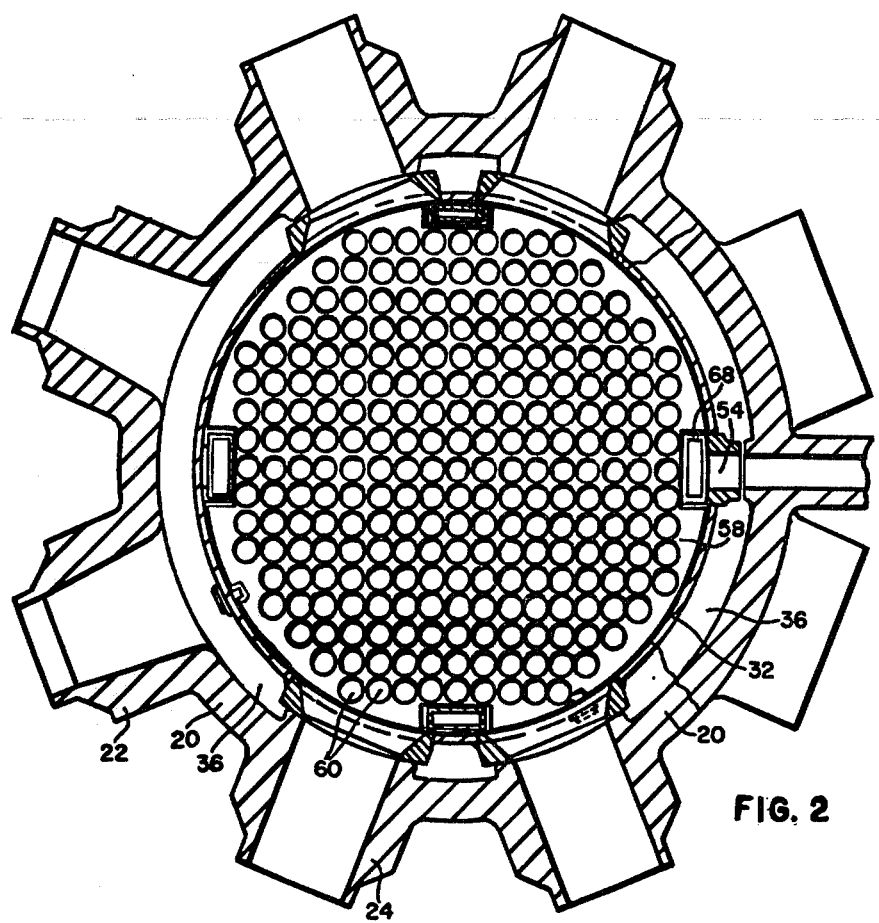
FIG. 2 is a plan view taken along line II—II of FIG. 1.
FIG. 10 is a graphic illustration of the power distribution among the fuel assemblies.

FIG. 2, illustrating a view of a pressure vessel 20, contributes to a better understanding of the relationship of a various inlet and outlet means, 22 and 24 respectively, and the recirculation inlets 54. Although four inlet means 22 and four outlet means 24 are shown, together with a corresponding number of recirculation inlets 54, the invention is equally applicable to a nuclear reactor system having any number of inlet and outlet means. As can be seen, the outlet means 24 pass from the outlet plenum 56 above the nuclear core 26 although the core barrel 32, the annular outer space 36 and the pressure vessel 20 to the exterior of the pressure vessel 20. The vessel coolant inlet means 22 pass through the pressure vessel 20 only to the outer space 36. As can be seen, the cold reactor coolant entering through the inlet means 22 flows down into the outer space 36 between the pressure vessel 20 and the core barrel 32, to the bottom of the pressure vessel. The recirculation system inlets 54 pass through the pressure vessel 20, the outer space 36, the core barrel 32, and to a recirculation system downcomer duct 68. As shown, the downcomer duct 68 is attached to the inside wall of the core barrel 32.

The upper core plate 58 completely covers the inside of the core barrel 32 at its location above the nuclear core 26. This upper core plate 58 forms the bottom of the outlet plenum 56. The core plate 58 has a plurality of openings 60 through which the reactor coolant, water, can flow from the nuclear core 26 to the outlet plenum 56. The upper core plate 58 also has openings 61 through which the downcomer ducts 68 pass.

Figure 3:
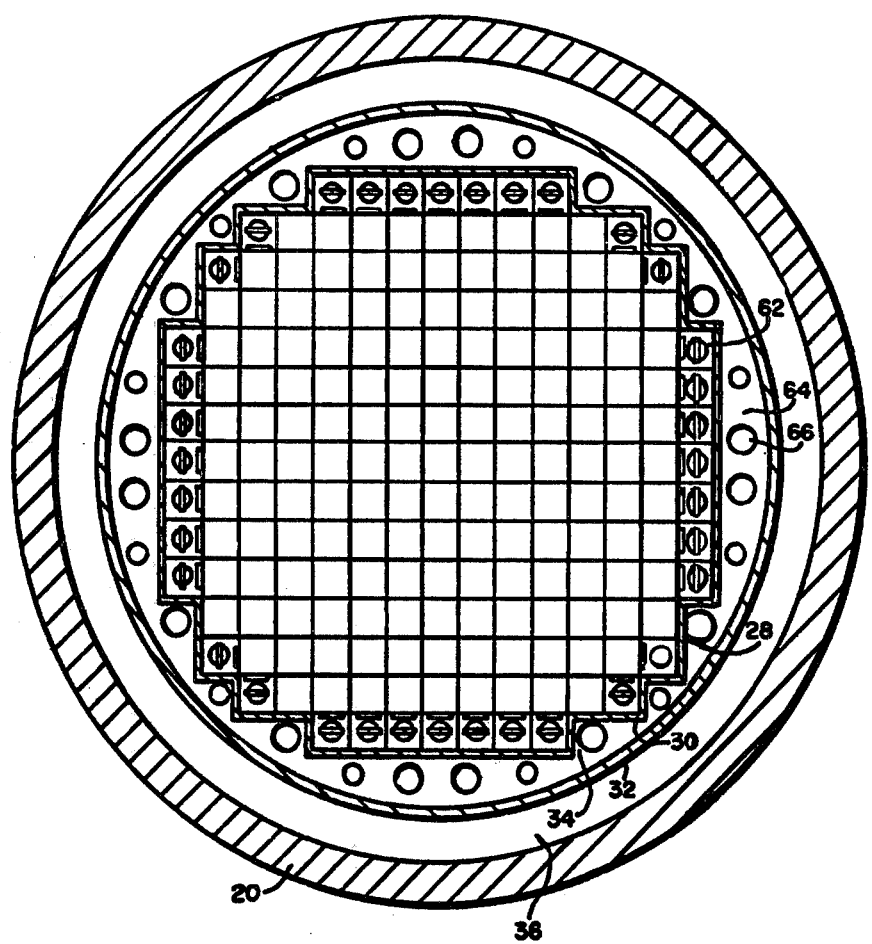
FIG. 3 is a plan view taken along line III—III of FIG. 1.

The arrangement of the fuel assemblies 28 is illustrated in FIG. 3. The fuel assemblies 28 which are located adjacent to the core baffle 30 are called the peripheral fuel assemblies 62. The distinguishing characteristic of the peripheral fuel assemblies 62 is that they are not surrounded on each side by other fuel assemblies 28. In other words, one or more sides of peripheral assemblies 62 are not in contact with other fuel assemblies 28. These peripheral fuel assemblies 62 generally have a lower average power than the fuel assemblies 28 positioned internally of these peripheral fuel assemblies 62 (see FIG. 10).

The core baffle 30 is secured to the core barrel 32 by a plurality of horizontal former plates 64 located within the inner space 34. The securing former plates 64 have a plurality of openings 66 through which the hot recirculation reactor coolant flows.

Figure 4:
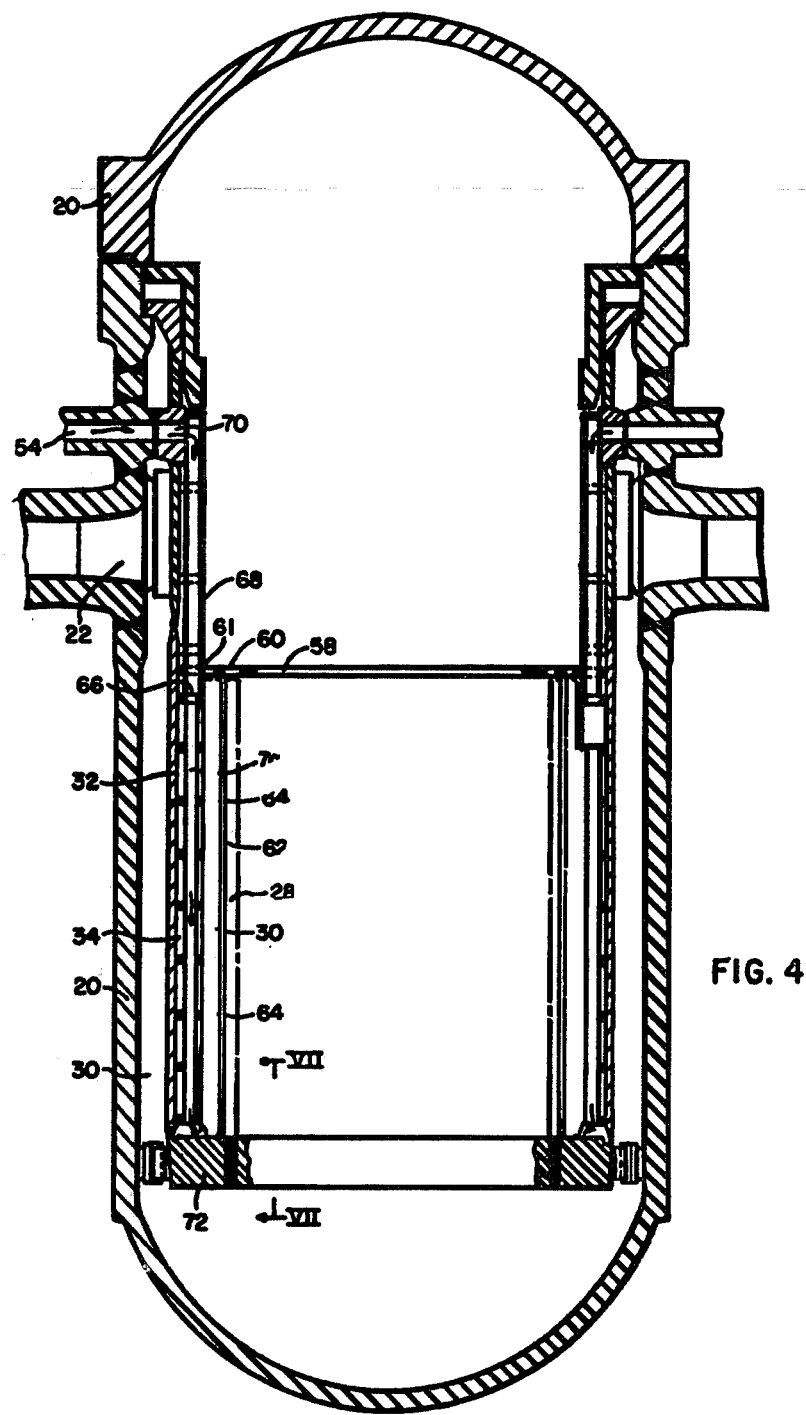
FIG. 4 is an elevational view taken along line IV—IV of FIG. 1.

FIG. 4 illustrates the flow path of the circulation coolant inside the pressure vessel 20. The recirculation coolant inlet 54 is located at an elevation higher than that of the pressure vessel coolant inlet means 22 and the pressure vessel coolant outlet means 24. The recirculation coolant inlet 54 passes through the pressure vessel 20, the outer space 36 between the pressure vessel 20 and the core barrel 32, through the core barrel 32, and to the downcomer duct 68. The downcomer duct 68 is located inwardly of the core barrel 32 at the four locations of the recirculation coolant inlets 54. The downcomer duct 68 extends from the opening 70 in the core barrel 32 through which the inlet 54 passes, to the opening 61 in the upper core plate 58 above the inner space 34 between the core barrel 32 and the core baffle 30.

The upper core plate 58 is located above the nuclear core 26, and extends radially outward to the core barrel 32. In this location, the upper core plate 58 is positioned atop the core baffle 30, thereby preventing the flow of hot reactor coolant from the core 26 and the outlet plenum 56 into the inner space 34 between the core barrel 32 and the core baffle 30. The former plates 64 which secure the core baffle 30 to the core barrel 32 have holes 66 therethrough so that the recirculation system coolant can flow downward through the plate 64, through the inner space 34 to the top of the lower core plate 72. If it is so desired, recirculation flow tubes 74 can be inserted into these openings 66 in the support plates 64 for the passage of the recirculation system coolant.

Figure 5:
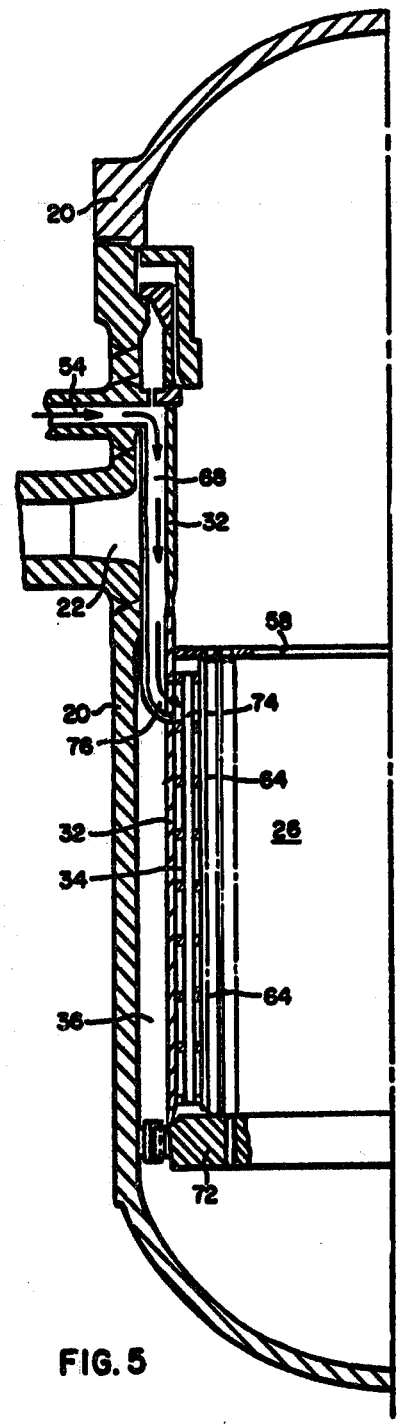
FIG. 5 is a modification of the view of FIG. 4.

FIG. 5 shows a modification of the flow path of FIG. 4. In this modification, the recirculation coolant inlet 54 passes through the pressure vessel 20 to the outer space 36. Positioned in the outer space 36 is the downcomer duct 68, secured to the core barrel 32. The core barrel 32 has an opening 76 into the inner space 34. This opening 76 is positioned at an elevation lower than the elevation of the upper core plate 58. The downcomer duct 68 then extends in the outer space 36 from the recirculation coolant inlet 54 to the opening 76 through the core barrel 32. The remainder of the flow path to the lower core plate 72 is as previously described. In this modification, though, the opening 61 in the upper core plate 58 above the inner space 34 would not be present.

Figure 6:
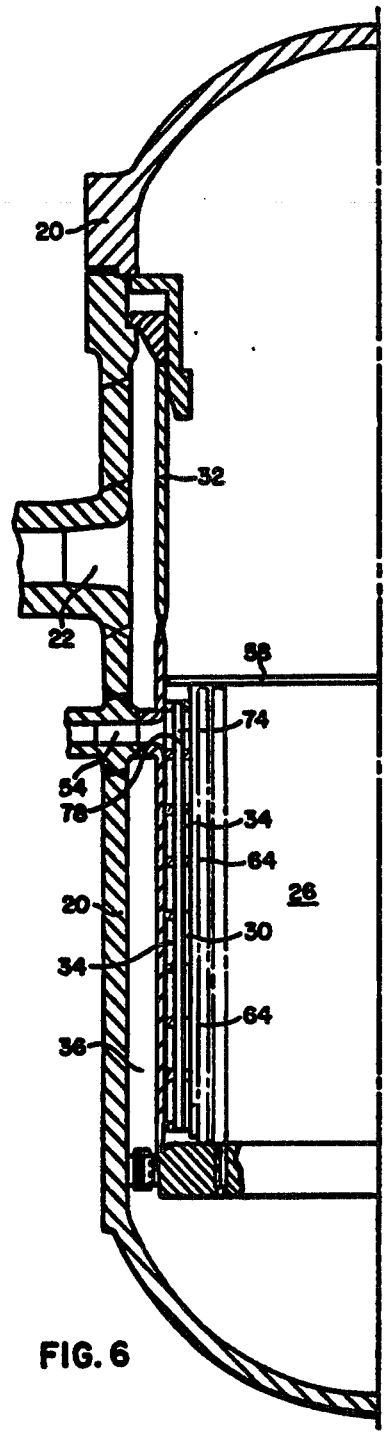
FIG. 6 is a modification of the view of FIG. 4.

FIG. 6 illustrates a further modification of the flow path illustrated in FIG. 4. In this modification, the recirculation coolant inlet 54 is located at an elevation beneath the elevation of the inlet means 22 and the outlet means 24. The recirculation coolant inlet 54 also is at an elevation below that of the upper core plate 58. The recirculation inlet 54 extends through the pressure vessel 20, the outer space 36, the core barrel 32, and to the inner space 34. In this location no downcomer duct is needed, and the coolant entering through the recirculation coolant inlet 54 can flow through the openings 66, wherein the recirculation flow tubes 74 are located, through the inner space 34, to the lower core plate 72. Because in this modification the circulation system inlet 54 is at an elevation directly opposite the nuclear core 26, it may be desirable to provide an additional layer of shielding 78 opposite the recirculation inlet 54 adjacent to the core baffle 30. This additional shielding 78 would reduce the amount of neutron flux from the core 26 impinging on the recirculation inlet 54.

Figure 7:
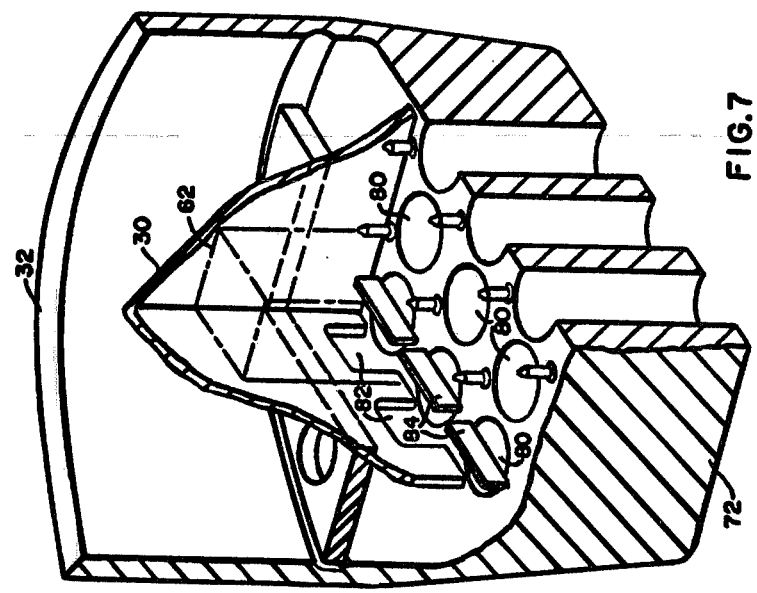
FIG. 7 is a detailed view taken along line VII—VII of FIG. 4.

FIG. 7 illustrates the area beneath the nuclear core 26. A lower core plate 72 is secured to the core barrel 32 and secured to the lower core plate 72 is the core baffle 30. The lower core plate 72 has a plurality of openings 80 through which cold reactor coolant can flow from the outer space 36, through the bottom of the pressure vessel 20 and up to the fuel assemblies 28, 62, in the nuclear core 26. The core baffle 30 has openings 82 adjacent to the lower core plate 72 through which the reactor coolant flowing through the inner space 34 can flow to the top of the lower core plate 72 beneath the nuclear core 26. The openings 82 can be of any shape desired, and do not have to be of a uniform size. For example, those openings 82 positioned adjacent the peripheral fuel assemblies 62 of high power (see FIG. 10) can be smaller than the openings 82 adjacent to the peripheral flow assembly 62 having low average power. In this manner, the temperature of the coolant entering the fuel assemblies 62 can be varied according to the power output of the individual fuel assemblies 62.

During operation, the reactor coolant flowing through the openings 80 in the lower core plate 72 mixes wih the hotter coolant flowing through the openings 82 in the core baffle 30, thus raising the temperature of the coolant flowing to the peripheral fuel assemblies 62. The coolant flowing through the openings 82 of the core baffle 30 does not penetrate past the peripheral fuel assemblies 62 to any great extent because of the force of the coolant flowing through the openings 80 in the lower core plate 72.

Figure 8:
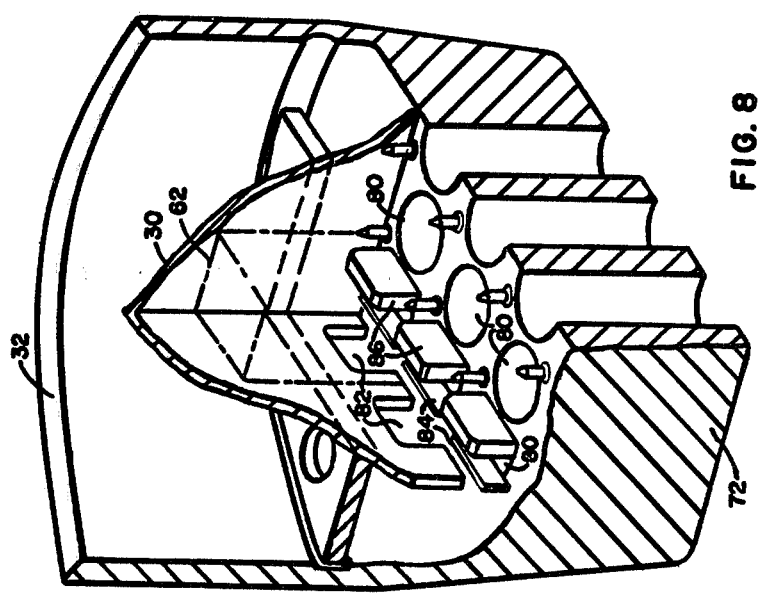
FIG. 8 is a modification of the view shown in FIG. 7.

If additional control is desired, means for distributing the coolant flowing through the openings 82 of the core baffle 30 from the inner space 34 can be positioned on the lower core plate 72. As shown in FIG. 8, this means for distributing flow can take the form of plates 84 positioned on top of the openings 80 adjacent to the core baffle 30. If further control is desired, additional diversion plates 86 can be positioned inwardly of the openings 80 in the lower core plate 72 adjacent to the core baffle 30 to further prohibit the coolant flowing to non-peripheral fuel assemblies 28. These plates 84 and 86, in cooperation with the coolant flowing through the opening 80, distribute substantially all of the coolant flowing through the recirculation system to the peripheral fuel assemblies 62.

FIG. 9 illustrates a modification of the flow distributing means. In this modification, the flow distributing means are tubes 88 positioned in the lower core plate 72 above each opening 80. In this modification, there is a plurality of coolant openings 80 for each individual peripheral fuel assembly 62. The number of tubes 88 and openings 80 is not symmetrical; a lesser number of flow distribution tubes 88 are located adjacent to the core baffle 30 than are located inwardly of the core baffle 30. The number of flow distribution tubes 88 under the inner edge of the peripheral fuel assembly 62, in conjunction with the normal coolant flow, substantially blocks all the hot recirculation coolant flow from going to the inner fuel assemblies 28. In this manner, not only is the flow from the recirculation system prevented from mixing to any substantial extent with the flow of reactor coolant going to the inner fuel assemblies 28, but the flow going to the fuel rods 90 (a plurality of which make up a fuel assembly 28 or 62) located next to the core baffle 30, such fuel rods operating at lower power levels, is at a higher temperature than the coolant going to the higher-power fuel rods 90 located adjacent to the inner fuel assemblies 28. FIG. 13, a plan view of this flow distribution means, illustrates the non-symmetrical alignment of the flow distribution tubes 88 beneath one peripheral fuel assembly 62.

FIG. 11 illustrates a further modification of the flow distribution means. In this modification, each fuel assembly 28 or 62 has a corresponding opening 80 in the lower core plate 72. The flow distribution tubes 88 are located as before in a non-symmetrical arrangement, but instead of being permanently secured to the lower core plate 72 are instead formed integral with a tube plate 91. This tube plate 91 is then secured, such as by bolts 94, to the lower core plate 72. The use of this modification enables the reactor to be operated without the flow distribution means originally, and if the proper temperature rise in the peripheral fuel assembly 62 inlet coolant is not attained, the tube plate 91, part of a flow distribution means, can be inserted to "fine-tune" the reactor.

The portion of reactor coolant to be extracted by the extraction means 48 and supplied to the recirculation coolant inlet 54 depends upon the number of fuel assemblies 28, the number of peripheral fuel assemblies 62, the flow rate of reactor coolant through the inlet means 22 and the outlet means 24, and the desired temperature increases. For example, in the reactor illustrated, there are 193 individual fuel assemblies 28, 62. Of these fuel assemblies 28, 62, forty-four are peripheral fuel assemblies 62. Of the forty-four peripheral fuel assemblies 62, thirty-six have average power substantially beneath that of the core average while eight have power approximating that of the core average. (FIG. 10 illustrates the average power output as compared to core average for one-fourth of the core). Each fuel assembly 28, 62 receives 2000 gallons per minute of reactor coolant, in this case, water. The total amount of reactor coolant having the pressure vessel 20 is 193×2000 or 386,000 gallons per minute. For a temperature increase of 5° F., a mixture of 50% cold reactor coolant and 50% hot reactor coolant for the peripheral assemblies 62 is sufficient. In this case, 36,000 gallons per minute of reactor coolant should be extracted from the outlet means 24 of the pressure vessel 20, flow through the recirculation piping 50 and enter the recirculation coolant inlet 54. This is approximately 9% of the reactor coolant being recirculated.

In addition to being connected to the supplying means 100 of the recirculation system (see FIG. 1), the recirculation coolant inlet 54 is connected to a means 102 for inserting an emergency coolant into the pressure vessel 20. The means 102 for inserting an emergency coolant can be comprised of a safety injection pump 104 and a supply 106 of emergency coolant such as boronated water. The piping 108 from the safety injection pump 104 and the piping 50 from the recirculation system pump 52 are coupled such that coolant flowing from the safety injection pump 104 will be prevented from flowing through the recirculation piping 50 to bypass the core 26. Means for preventing the emergency coolant from flowing through the recirculation piping 50 can depend upon the fact that the emergency coolant will be pumped at a higher pressure than will the recirculation coolant. A check valve 110, or other similar device, inserted into the recirculation piping 50 will close and prevent the emergency coolant from bypass flow. If it is so desired, means 112 for stopping the operation of the circulation pump 52 can be connected to the safety injection pump 104 such that when the safety injection pump 104 begins operating, the recirculation pump 52 is stopped. This would lessen back pressure on the valve 110 and result in a surer closure.

Thus, it can be seen that this invention provides an economical means of increasing the outlet temperature of a nuclear reactor while additionally enhancing the safety of the reactor in the event of a loss of coolant accident.

What is claimed is:

1. A recirculation system for nuclear reactor systems including a closed cylindrical nuclear reactor pressure vessel having vessel coolant inlet means and vessel coolant outlet means, a heat exchanger, piping interconnecting said heat exchanger, said vessel coolant inlet means, and said vessel coolant outlet means, a main coolant pump positioned in said piping, and a reactor coolant flowing throughout said nuclear reactor system, said recirculation system comprising:
  a cylindrical core barrel positioned in and secured to said pressure vessel, said core barrel and said pressure vessel forming an annular outer space therebetween;
  a lower core plate secured to the bottom of said core barrel, said lower core plate having openings therein through which reactor coolant passes;
  a core baffle positioned in and secured to said core barrel, said core baffle being secured to said core plate, said core baffle having openings therein adjacent said lower core plate, said core baffle and said core barrel forming an inner space therebetween;
  a nuclear core comprising a plurality of fuel assemblies, said core being positioned in said core barrel above said lower core plate;
  means for extracting a portion of reactor coolant from said vessel coolant outlet means; and
  means for supplying said portion of reactor coolant extracted from said vessel coolant outlet means to said inner space comprising:
  a recirculation coolant inlet through said pressure vessel, said recirculation coolant inlet being in fluid communication with said inner space;
  recirculation piping interconnecting said recirculation coolant inlet and said means for extracting a portion of said reactor coolant from said vessel coolant outlet means; and
  a recirculation pump positioned in said recirculation piping.

2. The system according to claim 1 wherein said reactor coolant is water.

3. The system according to claim 1 wherein an upper core plate is positioned above said nuclear core, said upper core plate extending radially outward to said core barrel, said upper core plate being positioned atop said core baffle, said upper core plate having a plurality of openings therein above said nuclear core for the passage of said reactor coolant, said upper core plate, said core barrel, and said pressure vessel forming an outlet plenum therebetween, said vessel coolant outlet means being in fluid communication with said outlet plenum.

4. The system according to claim 3 wherein said vessel coolant inlet means is located at an elevation,
  said recirculation coolant is located at an elevation, said recirculation coolant inlet elevation being vertically higher than said vessel coolant inlet means elevation,
  said core barrel having an opening therein, said opening in said core barrel being vertically lower than said upper core plate, and
  a downcomer duct positioned in said outer space, said downcomer duct extending from said recirculation coolant inlet to said opening in said core barrel, whereby said portion of reactor coolant extracted from said vessel coolant outlet means flows through said recirculation coolant inlet, through said downcomer duct, through said opening in said core barrel and into said inner space.

5. The system according to claim 3 wherein said vessel coolant inlet means is located at an elevation,
  said recirculation coolant inlet is located at an elevation, said recirculation coolant inlet elevation being vertically higher than said vessel core inlet means, said core barrel having an opening therein, said opening in said core barrel being opposite said recirculation coolant inlet,
  said upper core plate having an opening therein above said inner space, and
  a downcomer duct positioned adjacent said core barrel in said outlet plenum, said downcomer duct extending from said opening in said core barrel to said opening in said upper core plate above said inner space, whereby said portion of reactor coolant extracted from said vessel coolant outlet means flows through said recirculation coolant inlet, through said opening in said core barrel, through said downcomer duct, through said opening in said upper core plate, and into said inner space.

6. The system according to claim 3 wherein said upper core plate is located at an elevation, said recirculation coolant inlet is located at an elevation, said recirculation coolant inlet elevation being vertically lower than said upper core plate elevation, said recirculation coolant inlet extending through said pressure vessel, through said outer space, through said core barrel, and to said inner space.

7. The system according to claim 3 wherein a plurality of baffle former plates secured said core baffle to said core barrel, said baffle former plates being positioned in said inner space, said baffle former plates having openings therein for the passage of said reactor coolant.

8. The system according to claim 6 wherein a recirculation flow tube is positioned in said opening in said baffle former plate, said reactor coolant flowing through said recirculation flow tube.

9. The system according to claim 1 wherein said lower core plate includes means for distributing said portion of reactor coolant extracted from said vessel coolant outlet means to said fuel assemblies adjacent said core baffle.

10. The system according to claim 9 wherein substantially all of said portion of reactor coolant extracted from said vessel core outlet means is distributed to said fuel assemblies positioned adjacent said core baffle.

11. The system according to claim 10 wherein each of said fuel assemblies is comprised of a plurality of fuel rods.

12. The system according to claim 11 wherein substantially all of said portion of reactor coolant extracted from said vessel core outlet means is distributed to said fuel rods positioned adjacent said core baffle.

13. The system according to claim 9 wherein said means for distributing said portion of reactor coolant extracted from said vessel coolant outlet means includes a plurality of flow distribution tubes secured to said lower core plate, said flow distribution tubes being in fluid communication with said openings in said lower core plate, whereby said reactor coolant flowing through said openings in said lower core plate flows through said flow distribution tubes.

14. The system according to claim 2 comprising:
means for inserting an emergency coolant into said recirculation coolant inlet; and
means for preventing said emergency coolant flowing through said recirculation piping.

15. The system according to claim 14 wherein said means for preventing said emergency coolant flowing through said recirculation piping comprises a check valve positioned in said recirculation piping.

16. The system according to claim 15 wherein said emergency coolant is boronated water.

17. The system according to claim 14 wherein said means for preventing said emergency coolant flowing through said recirculation piping includes means for stopping operation of said circulation pump, said means for stopping operation of said circulation pump being responsive to operation of said means for inserting an emergency coolant into said recirculation coolant inlet.

* * * * *